(12) United States Patent
Kato et al.

(10) Patent No.: US 11,506,518 B2
(45) Date of Patent: Nov. 22, 2022

(54) PHOTOELECTRIC ROTARY ENCODER

(71) Applicant: Mitutoyo Corporation, Kanagawa (JP)

(72) Inventors: Yoshiaki Kato, Kanagawa (JP);
Miyako Mizutani, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 17/529,476

(22) Filed: Nov. 18, 2021

(65) Prior Publication Data
US 2022/0170764 A1 Jun. 2, 2022

(30) Foreign Application Priority Data
Nov. 30, 2020 (JP) .............................. JP2020-198318

(51) Int. Cl.
*G01D 5/34* (2006.01)
*G01D 5/347* (2006.01)

(52) U.S. Cl.
CPC ....... *G01D 5/34707* (2013.01); *G01D 5/3473* (2013.01)

(58) Field of Classification Search
CPC ........... G01D 5/34707; G01D 5/34715; G01D 5/3473
See application file for complete search history.

(56) References Cited

U.S. PATENT DOCUMENTS

| 4,518,859 | A | * | 5/1985 | Hoshika | ................... | G01D 5/36 |
| | | | | | | 250/237 G |
| 6,635,863 | B1 | | 10/2003 | Nihommori et al. | | |
| 2021/0348954 | A1 | * | 11/2021 | Uemura | ............... | G01D 5/3473 |

FOREIGN PATENT DOCUMENTS

JP 2001-116592 4/2001

* cited by examiner

*Primary Examiner* — Kevin K Pyo
(74) *Attorney, Agent, or Firm* — Rankin, Hill & Clark LLP

(57) ABSTRACT

The photoelectric rotary encoder includes: a generally disk-shaped scale with a grating-like pattern formed with a predetermined period along a measurement direction, the measurement direction being a direction of rotation of a measurement target that rotates on a predetermined axis, the scale being plate-like and centered on an axis of rotation; and a head that detect, from the scale, the amount of displacement caused by the rotation of the measurement target. The head includes a light source, a diffraction unit with grating parts, and a light-receiving unit with light-receiving elements. The grating parts of the diffraction unit are formed as deformed grating parts that spread cut wide, from the center on the axis of rotation, along the grating-like pattern of the scale. The light-receiving elements are formed as linear grating parts.

12 Claims, 5 Drawing Sheets

PHOTOELECTRIC ROTARY ENCODER

CROSS-REFERENCE TO RELATED APPLICATION

This non-provisional application claims priority under 35 U.S.C. § 119(a) from Japanese Patent Application No. 2020-198318, filed on Nov. 30, 2020, the entire contents of which are incorporated herein by reference.

BACKGROUND

Technical Field

The present invention relates to photoelectric rotary encoders.

Background Art

As to photoelectric linear encoders, those based on the three-grating principle have conventionally been known Specifically, a photoelectric linear encoder includes a light source, an index with a first grating, a scale with second grating, and a light-receiving unit with a third grating. The first grating of the index is a grating with a grating pattern formed with a predetermined period along the measurement direction. The index is disposed between the light source and the scale, and allows the light from the light source to pass through itself toward the scale. The second grating of the scale has a grating-like pattern formed along the measurement direction. The third grating of the light-receiving unit includes a plurality of light-receiving elements disposed with a predetermined period along the measurement direction. The light-receiving unit receives interference fringes consisting of light and dark fringes, which are interfering light generated by the light that has passed through the index and the scale. These interference fringes have the same period as that of the grating-like pattern of the scale (the second grating). In this case, when the scale is moved by a distance L in the measurement direction, the interference fringes generated at the light-receiving unit will move by a distance 2 L. The photoelectric linear encoder calculates the amount of relative movement between the scale and a head based on the change in phase, which represents the movement of the interference fringes.

On the other hand, photoelectric rotary encoders have conventionally been known. A photoelectric rotary encoder includes a generally disk-shaped scale with a grating-like pattern formed with a predetermined period along the measurement direction, and a head that detects, from the scale, the amount of displacement caused by the rotation of a measurement target. The head includes a light source, an index with a first grating, a scale with a second grating, and a light-receiving unit with a third grating. In such photoelectric rotary encoder, in order to employ the three-grating principle of the photoelectric linear encoders, the index and the scale are formed in an arc shape and the first and second gratings are disposed along the arcs. With such configuration, light that has passed through the index and the scale generates arc-shaped interference fringes on the light-receiving unit. Accordingly, a photoelectric rotary encoder based on the three-grating principle can be constructed by creating the light-receiving elements in an arc shape.

Meanwhile, there is a request for standardizing the light-receiving elements of the light-receiving unit between the photoelectric linear encoders and the photoelectric rotary encoders. For the photoelectric rotary encoders, the index and the light-receiving unit need to be formed in an arc shape to match the arc-shaped scale, as described above. Therefore, it is difficult to standardize the light-receiving elements of the light-receiving unit between the photoelectric linear encoders and the photoelectric rotary encoders.

Comparatively speaking, the optical encoder (photoelectric rotary encoder) described in, for example, Japanese Unexamined Patent Application Publication No. 2001-116592 includes a main scale with a scale grating having a grating pattern formed with a predetermined angle pitch along the measurement axis, and a detection head disposed opposite the main scale and with a light-receiving side optical grating that moves relative to the main scale in the direction of the measurement axis. Specifically, in this optical encoder, the scale grating alone is deformed into an arc shape, and gratings similar to those in the photoelectric linear encoders are employed in the index and light-receiving unit.

With such configuration, distorted interference fringes, including interference fringes generally similar to those in the photoelectric linear encoders, are generated roughly in the middle of the light-receiving unit. Because only the interference fringes generally similar to those in the photoelectric linear encoders are to be acquired, the optical encoder is provided with an aperture made of a mask material with a window provided only at a location where such interference fringes are generated. Since the distorted interference fringes are blocked out by the mask material of the aperture, the light-receiving unit can acquire only the interference fringes that have passed through the window and are generally similar to those in the photoelectric linear encoder.

SUMMARY OF THE INVENTION

Problems to be Solved by the Invention

However, despite the optical encoder described in Japanese Unexamined Patent Application Publication No. 2001-116592 being able to acquire interference fringes generally similar to those in the photoelectric linear encoder, because the interference fringes generated are themselves distorted, the signal-to-noise ratio (S/N ratio) of the signals used for detection is reduced. In particular, small-diameter photoelectric rotary encoders have a significant reduction in the signal-to-noise ratio, which can lead to poor precision, such as flickering in position.

An object of the present invention is to provide a photoelectric rotary encoder in which detection precision can be maintained while the three-grating principle is employed.

Means for Solving the Problems

The photoelectric rotary encoder of the present invention includes: a generally disk-shaped scale with a grating-like pattern formed with a predetermined period along a measurement direction, the measurement direction being a direction of rotation of a measurement target that rotates on a predetermined axis, the scale being plate-like and centered on an axis of rotation; and a head that detects, from the scale, the amount of displacement caused by the rotation of the measurement target. The head includes a light source, a diffraction unit, a passage unit, and a light-receiving unit. The light source delivers light to the scale. The diffraction unit is disposed, between the light source and the scale, parallel to the plate surface of the scale. The diffraction unit has a plurality of grating parts formed in a predetermined shape in a plane parallel to the plate surface of the scale in order to diffract the light from the light source. The diffraction unit is formed such that it is elongate in the direction parallel to the direction orthogonal to the radial direction of the scale. The passage unit is disposed in the travel direction of the light that has passed through the scale. In addition, the passage unit is disposed parallel to the plate surface of the scale. The passage unit has a plurality of grating parts formed in a predetermined shape in a plane parallel to the plate surface of the scale. The passage unit allows the light that has passed through the scale to pass through the passage unit. The passage unit is formed such that it is elongate in the direction parallel to the direction orthogonal to the radial direction of the scale. The light-receiving unit receives the light that has passed through the passage unit. The plurality of grating parts of either one of the diffraction unit or the passage unit are formed as a plurality of deformed grating parts that spread out wide, from the center on the axis of rotation, along the grating-like pattern of the scale. The plurality of grating parts of the other one of the diffraction unit or the passage unit are formed as a plurality of linear grating parts having a predetermined period along the orthogonal direction orthogonal to the radial direction from the center on the axis of rotation of the scale. The light-receiving unit receives interference light having a predetermined period along the orthogonal direction, the interference light being caused by diffraction at the diffraction unit and passing through the passage unit via the scale.

According to the present invention, in terms of the relationship among the diffraction unit, the scale and the passage unit, the plurality of grating parts of either one of the diffraction unit or the passage unit are formed as a plurality of deformed grating parts, and the plurality of grating parts of the other one of the diffraction unit or the passage unit are formed as linear grating parts. The deformed grating parts correct the distortion of the interference fringes, i.e., the interference light, and can generate interference fringes generally similar to those in the photoelectric linear encoders on the light-receiving unit. As such, the light-receiving unit can acquire the interference fringes generally similar to those in the photoelectric linear encoders. Therefore, detection precision can be maintained while the three-grating principle is employed in the photoelectric rotary encoder.

The photoelectric rotary encoder according to the present invention includes a scale and a head. The scale is formed in a generally disk-shape with a grating-like pattern formed with a predetermined period along a measurement direction. The measurement direction is a direction of rotation of a measurement target that rotates on a predetermined axis and the scale is plate-like and centered on an axis of rotation. The head detects, from the scale, the amount of displacement caused by the rotation of the measurement target. The head includes a light source, a diffraction unit, and a light-receiving unit. The light source delivers light to the scale. The diffraction unit is disposed, between the light source and the scale, parallel to the plate surface of the scale. The diffraction unit has a plurality of grating parts formed in a predetermined shape in a plane parallel to the plate surface of the scale in order to diffract the light from the light source. The diffraction unit is formed such that it is elongate in the direction parallel to the direction orthogonal to the radial direction of the scale. The light-receiving unit is disposed in the travel direction of the light that has passed through the scale. The light-receiving unit is disposed parallel to the plate surface of the scale. The light-receiving unit has a plurality of light-receiving elements formed in a predetermined shape in a plane parallel to the plate surface of the scale in order to receive the light that has passed through the scale. The light-receiving unit is formed such that it is elongate in the direction parallel to the direction orthogonal to the radial direction of the scale. Either one of the plurality of grating parts of the diffraction unit or the plurality of light-receiving elements of the light-receiving unit are formed as a plurality of deformed grating parts that spread out wide, from the center on the axis of rotation, along the grating-like pattern of the scale. The other one of the plurality of grating parts of the diffraction unit or the plurality of light-receiving elements of the light-receiving unit are formed as a plurality of linear grating parts having a predetermined period along the orthogonal direction orthogonal to the radial direction from the center on the axis of rotation of the scale. The light-receiving unit receives interference light having a predetermined period along the orthogonal direction, the interference light being caused by diffraction at the diffraction unit and passing through the passage unit via the scale.

According to the present invention, in terms of the relationship among the diffraction unit, the scale and the light-receiving unit, either one of the plurality of grating parts of the diffraction unit or the light-receiving elements of the light-receiving unit are formed as a plurality of deformed grating parts, and the other one of the plurality of grating parts of the diffraction unit or the light-receiving elements of the light-receiving unit are formed as linear grating parts. The deformed grating parts correct the distortion of the interference fringes, i.e., the interference light, and can generate interference fringes generally similar to those in the photoelectric linear encoders on the light-receiving unit. As such, the light-receiving unit can acquire the interference fringes generally similar to those in the photoelectric linear encoders. Therefore, detection precision can be maintained while the three-grating principle is employed in the photoelectric rotary encoder.

In this case, the plurality of grating parts in the diffraction unit are preferably formed as a plurality of deformed grating parts that spread out wide, from the center on the axis of rotation, along the grating-like pattern of the scale.

With such configuration, the light-receiving elements in common with the photoelectric linear encoders can be employed in the light-receiving unit. Therefore, the request for standardizing the light-receiving elements of the light-receiving unit between the photoelectric linear encoders and the photoelectric rotary encoders can be satisfied. In addition, since the light-receiving elements in common with the linear encoders can be employed in the light-receiving unit, costs can be reduced.

In this case, the plurality of deformed grating parts are preferably formed in line-symmetry with respect to an axis, which is in an orthogonal direction orthogonal to the axis of rotation.

With such configuration, by being formed in line-symmetry with respect to the axis, which is in the orthogonal direction orthogonal to the axis of rotation, the plurality of deformed grating parts can correct the interference fringes and can generate interference fringes generally similar to those in the photoelectric linear encoders with higher precision.

In this case, among the plurality of deformed grating parts, if a deformed grating part located on the axis in the orthogonal direction orthogonal to the rotation axis is denoted as the $0^{th}$ deformed grating part, the predetermined period of the linear grating parts is denoted as P, a radius from the axis of rotation to the scale is denoted as R, and a distance in the width direction of the scale is denoted as x, the shape of an $n^{th}$ deformed grating part is preferably formed based on a curve $C_n$ determined by expression (1) according to the first embodiment described below.

With such configuration, the plurality of deformed grating parts can be designed and produced with ease by being formed based on the curve $C_n$ as determined by the expression (1).

Alternatively, among the plurality of deformed grating parts, if a deformed grating part located on the axis in the orthogonal direction orthogonal to the rotation axis is denoted as the $0^{th}$ deformed grating part, the predetermined period of the linear grating parts is denoted as P, a radius from the axis of rotation to the scale is denoted as R, and a distance in the width direction of the scale is denoted as x, the shape of an $n^{th}$ deformed grating part is preferably formed based on a curve $C_{n+1}(x)$ determined by expression (2) according to the second embodiment described below.

If the plurality of deformed grating parts are employed, which are formed based on the curve $C_n$ determined by the above-described expression (1), in the photoelectric rotary encoder with a small-diameter scale, when the value of "n" in the $n^{th}$ deformed grating part becomes larger, the errors are superimposed and it may become difficult to generate interference fringes.

However, with the above-described configuration, by being formed based on the curve $C_{n+1}(x)$ as determined by the expression (2), the plurality of deformed grating parts allow the phase of the light to be compensated and the interference fringes to be easily generated even with the photoelectric rotary encoder with a small-diameter scale. Therefore, for the photoelectric rotary encoder, the plurality of deformed grating parts with higher precision for correction than that of the expression (1) can be designed and produced with ease.

In this case, the scale includes a grating-like pattern that reflects the light from the light source. The grating-like pattern preferably reflects the light diffracted at the diffraction unit.

If the separation distance between the light source and the diffraction unit and the separation distance between the scale and the passage unit or the light-receiving unit are different, interference fringes may not be generated at the light-receiving unit or precision may be reduced. For this reason, it is preferable for the respective components to be disposed at equal distances.

With such configuration, since the scale has a grating-like pattern that reflects light from the light source, the light that has passed through the diffraction unit can be reflected by the scale and folded back into the passage unit or the light-receiving unit. For this reason, the diffraction unit and the passage unit or the light-receiving unit can be co-planar. Therefore, in the photoelectric rotary encoder, the precision reduction in the interference fringes can be suppressed by being able to dispose, with ease, the respective components at equal distances. The photoelectric rotary encoder can also be made compact since the light is reflected by the scale.

DETAILED DESCRIPTION OF THE EMBODIMENTS

First Embodiment

The first embodiment of the present invention will be described below with reference to the drawings.

Figure 1:
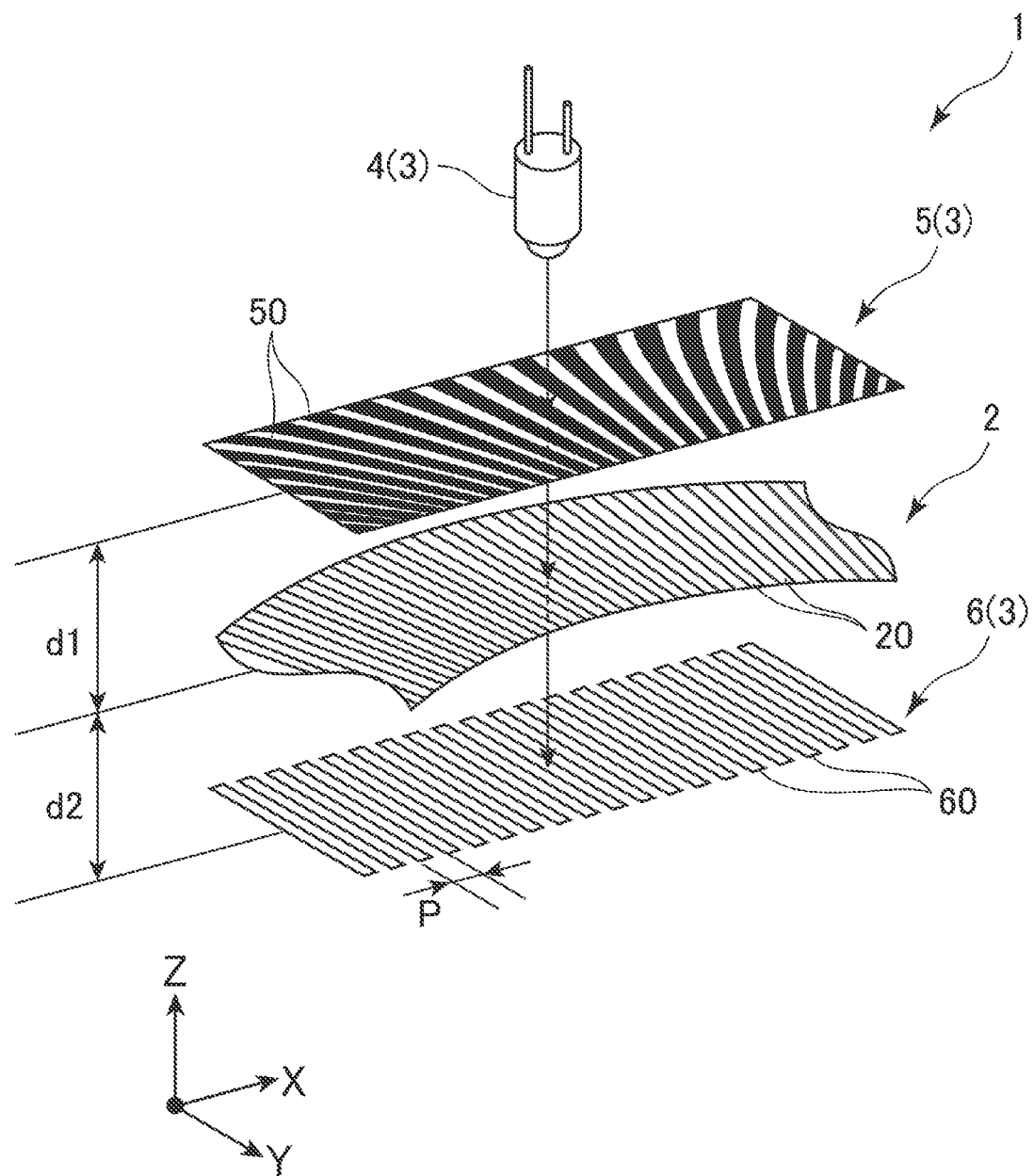
FIG. 1 is a perspective view schematically showing a photoelectric rotary encoder according to a first embodiment.

FIG. 1 is a perspective view schematically showing a photoelectric rotary encoder 1 according to the first embodiment.

In the photoelectric rotary encoder 1, the rotation direction of a measurement target that rotates around a predetermined axis (not shown) is defined as the measurement direction. As shown in FIG. 1, the photoelectric rotary encoder 1 includes a generally disk-shaped scale 2 that is plate-like and centered on the axis of rotation, and a head 3 that detects, from the scale 2, the amount of displacement caused by the rotation of the measurement target.

The scale 2 is made of a translucent member, such as glass, that allows light to transmit through the scale. One side of the scale 2 is formed with a grating-like pattern 20 formed with a predetermined period along the measurement direction.

The head 3 includes a light source 4 that delivers light to the scale 2, a diffraction unit 5 that is disposed between the light source A and the scale 2, and a light-receiving unit 6 that is disposed in the travel direction of the light that has passed through the scale 2. The head 3 including these elements is provided such that it can advance or retreat in an integral manner along the measurement direction relative to the scale 2.

The light source 4 delivers parallel light perpendicularly to one side of the scale 2. A light emitting diode (LED) may be employed for the light source 4. However, the light source 4 is not limited to LEDs and any light source may be used.

The diffraction unit 5 is disposed parallel to the plate surface of the scale 2. The diffraction unit 5 is formed such that it is elongate in the X direction, which is parallel to the direction orthogonal to the radial direction of the scale 2. The diffraction unit 5 has a plurality of grating parts 50 formed in a predetermined shape in the XY plane, which is parallel to the plate surface of the scale 2. The plurality of grating parts 50 diffract light from the light source 4. The diffraction unit 5 is made of glass that allows light from the light source 4 to transmit through the diffraction unit. The diffraction unit 5 is disposed at a position separated from the scale 2 by a distance d1.

The plurality of grating parts 50 in the diffraction unit 5 are formed as a plurality of deformed grating parts 50 that spread out wide, from the center on the axis of rotation, along the grating-like pattern 20 of the scale 2. The method of designing the plurality of deformed grating parts 50 will be described later. In the following description, the X, Y, and Z directions will be defined as follows: The direction parallel to the direction orthogonal to the radial direction of the scale 2 will be defined as the X direction. The direction orthogonal to the X direction on the plate surface of the scale 2 will be defined as the Y direction. The direction parallel to the axis of rotation of the scale 2 and orthogonal to both the X direction and the Y direction will be defined as the Z direction. In addition, the plurality of deformed grating parts 50 are shown in black in the drawings so that their shape can be clearly identified; however, such parts can be made of a transparent material or an opaque material, or they can be formed with a thickness different from that of the adjacent white parts, or they can be formed as holes. In short, the plurality of deformed grating parts can be formed in any way as long as they function as deformed grating parts.

The light-receiving unit 6 is disposed parallel to the plate surface of the scale 2. The light-receiving unit 6 receives light that has passed through the scale 2 and is formed such that it is elongate in the X direction, which is parallel to the direction orthogonal to the radial direction of the scale 2. The light-receiving unit 6 includes a plurality of light-receiving elements 60. The light-receiving elements 60 receive a plurality of diffraction light rays that have transmitted through the scale 2 and the diffraction unit 5, and detect signals from the interference fringes generated by the plurality of diffraction light rays. The light-receiving elements 60 are formed in a predetermined shape in the XY plane, which is parallel to the plate surface of the scale 2. Specifically, the plurality of light-receiving elements 60 are formed as a plurality of linear grating parts having a predetermined period P along the X direction, which is orthogonal to the radial direction from the center on the axis of rotation of the scale 2 parallel to the Z direction. The light-receiving unit 6 receives interference fringes (not shown) caused by diffraction at the diffraction unit 5 and passing through the scale 2. The interference fringes are interfering light having a predetermined period P along the X direction, which is the orthogonal direction.

A photo diode array (PDA) is used for the light-receiving elements 60, and the light-receiving elements 60 are installed such that they overlap with the diffraction unit 5 and scale 2. In other words, the diffraction unit 5 and the light-receiving unit 6 are installed opposite each other such that they overlap with each other, with the scale 2 sandwiched therebetween. A PDA is a detector with the ability to measure a plurality of interference fringes at once. The plurality of light-receiving elements 60 are not limited to PDAs and any detector may be used, such as a position sensitive detector (PSD) or a charge-coupled device (CCD).

Figure 2:
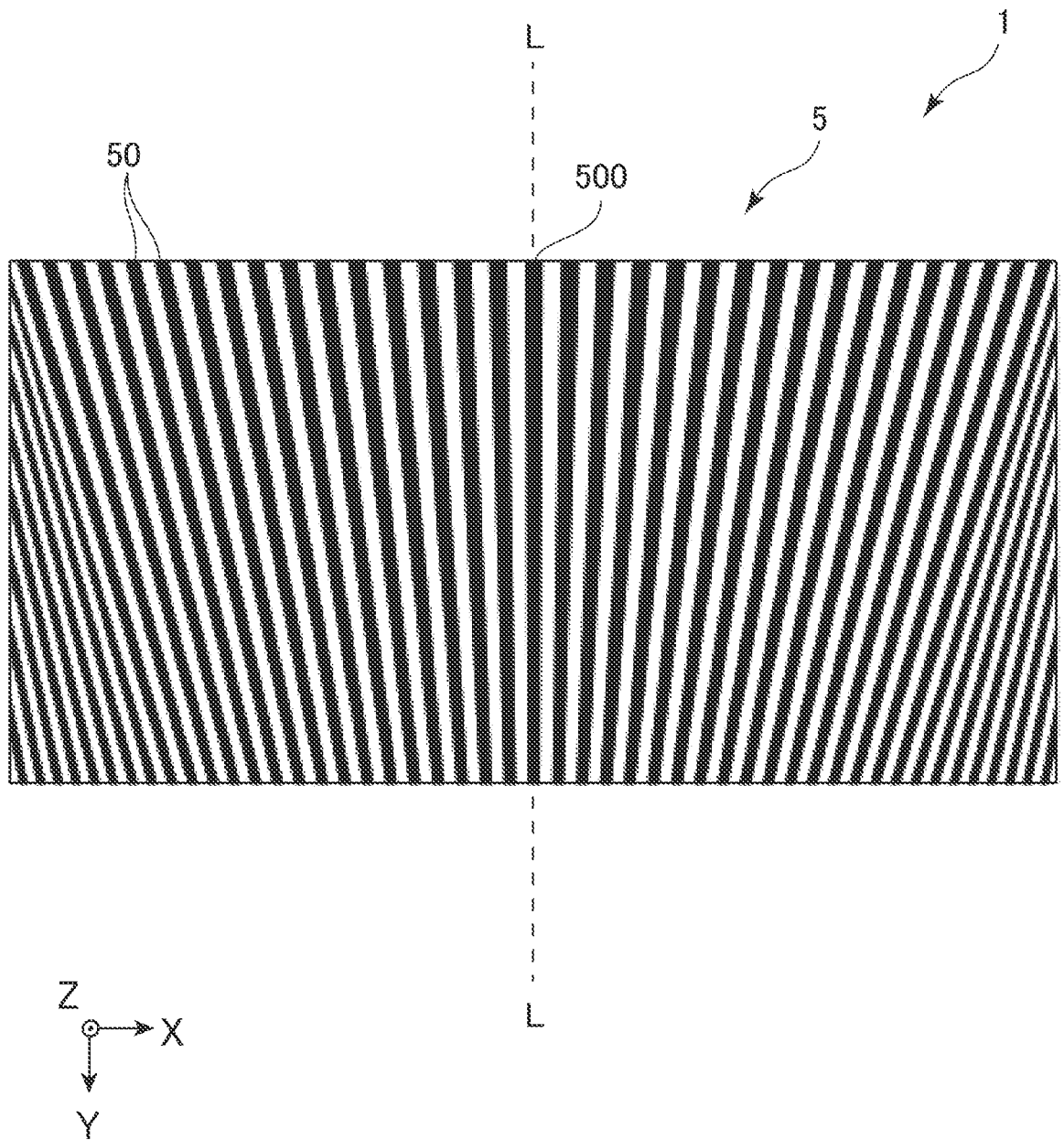
FIG. 2 is a plan view showing deformed grating parts in the photoelectric rotary encoder mentioned above.

FIG. 2 is a plan view showing deformed grating parts 50 in the photoelectric rotary encoder 1.

As shown in FIG. 2, the plurality of deformed grating parts 50 in the diffraction unit 5 are formed in line-symmetry with respect to an axis L. The axis L is in the orthogonal direction orthogonal to the axis of rotation (not shown) parallel to the Z direction. Hereinafter, the method of designing the plurality of deformed grating parts 50 will be described.

First, among the plurality of deformed grating parts 50, a deformed grating part 500 located on the axis L in the orthogonal direction orthogonal to the rotation axis is denoted as the $0^{th}$ deformed grating part 500. Next, the predetermined period of the linear grating parts, i.e., the light-receiving elements 60 (see FIG. 1), is denoted as P, the radius from the axis of rotation to the scale 2 (see FIG. 1) is denoted as R, and the distance in the width direction of the scale 2 is denoted as x. In this case, the shape of an $n^{th}$ deformed grating part is formed based on the curve $C_n$ as determined by the expression (1).

$$C_n = \frac{Pn\cos\frac{Pn}{R} - \tan\frac{P}{R}x}{2P\cos\frac{Pn}{R} - \tan\frac{Pn}{R}x} \quad (1)$$

According to such embodiment, the following effects can be achieved:

(1) In terms of the relationship among the diffraction unit 5, the scale 2 and the light-receiving unit 6, the plurality of grating parts 50 of the diffraction unit 5 are formed as a plurality of deformed grating parts, and the plurality of light-receiving elements 60 of the light-receiving unit 6 are formed as linear grating parts. The deformed grating parts 50 correct the distortion of the interference fringes and can generate interference fringes generally similar to those in the photoelectric linear encoders on the light-receiving unit 6. As such, the light-receiving unit 6 can acquire interference fringes generally similar to those in the photoelectric linear encoders. Therefore, detection accuracy can be maintained while the three-grating principle is employed in the photoelectric rotary encoder 1.

(2) The light-receiving elements 60 in common with the photoelectric linear encoders can be employed in the light-receiving unit 6. Therefore, the request for standardizing the light-receiving elements 60 of the light-receiving unit 6 between the photoelectric linear encoders and the photoelectric rotary encoders (such as the photoelectric rotary encoder 1) can be satisfied. In addition, since the light-receiving elements 60 in common with the linear encoders can be employed in the light-receiving unit 6, costs can be reduced.

(3) By forming the plurality of deformed grating parts 50 in line-symmetry with respect to the axis L, which is in the orthogonal direction orthogonal to the axis of rotation parallel to the Z direction, the interference fringes can be corrected and interference fringes generally similar to those in the photoelectric linear encoders can be generated with higher precision.

(4) The plurality of deformed grating parts 50 can be designed and produced with ease by being formed based on the curve $C_n$ as determined by the expression (1).

Second Embodiment

The second embodiment of the present invention will be described below with reference to the drawings. In the following description, previously described parts are denoted by the same reference numbers and the descriptions thereof will be omitted.

Figure 3:
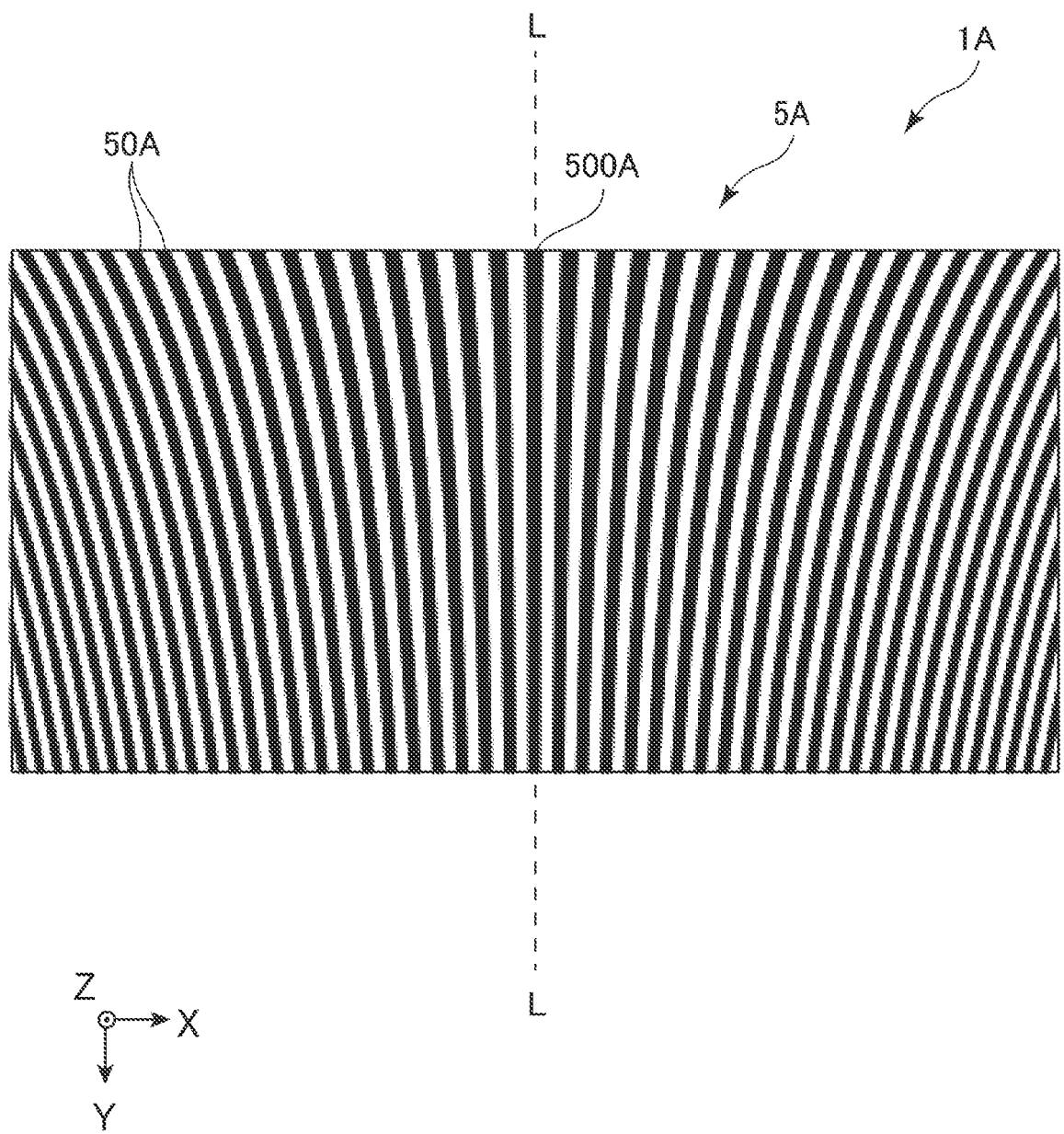
FIG. 3 is a plan view showing deformed grating parts in a photoelectric rotary encoder according to a second embodiment.

FIG. 3 is a plan view showing deformed grating parts 50 in a photoelectric rotary encoder 1A according to the second embodiment.

In the above-described first embodiment, the plurality of deformed grating parts 50 are formed based on the curve $C_n$ as determined by the expression (1). The second embodiment differs from the above-described first embodiment in that the plurality of deformed grating parts 50A are formed based on a curve determined by an expression different from the expression (1), as shown in FIG. 3. Hereinafter, the method of designing the plurality of deformed grating parts 50A in the second embodiment will be described.

First, among the plurality of deformed grating parts 50A, a deformed grating part 500A located on the axis L in the orthogonal direction orthogonal to the rotation axis is denoted as the $0^{th}$ deformed grating part. Next, the predetermined period of the linear grating parts, i.e., the light-receiving elements 60 (see FIG. 1), is denoted as P, the radius from the axis of rotation to the scale 2 (see FIG. 1) is denoted as R, and the distance in the width direction of the scale 2 is denoted as x. In this case, the shape of an $n^{th}$ deformed grating part 50A is formed based on the curve $C_{n+1}(x)$ as determined by the expression (2).

$$C_{n+1}(x) = C_n(x) - \frac{PR\left(\tan\frac{(n+1)P}{R} - \tan\frac{nP}{R}\right)x}{R\left(\tan\frac{(n+1)P}{R} - \tan\frac{nP}{R}\right)x - 2P} \quad (2)$$

In such second embodiment, the same effects as in (1) to (3) of the first embodiment may be achieved, and the following effects may also be achieved:

(5) By being formed based on the curve $C_{n+1}(x)$ as determined by the expression (2), the plurality of deformed grating parts 50 allow the phase of the light to be compensated and the interference fringes to be easily generated even with the photoelectric rotary encoder 1A with a small-diameter scale 2. Therefore, for the photoelectric rotary encoder 1A, a plurality of deformed grating parts with higher precision for correction than that of the expression (1) can be designed and produced with ease.

Third Embodiment

The third embodiment of the present invention will be described below with reference to the drawings. In the following description, previously described parts are denoted by the same reference numbers and the descriptions thereof will be omitted.

Figure 4:
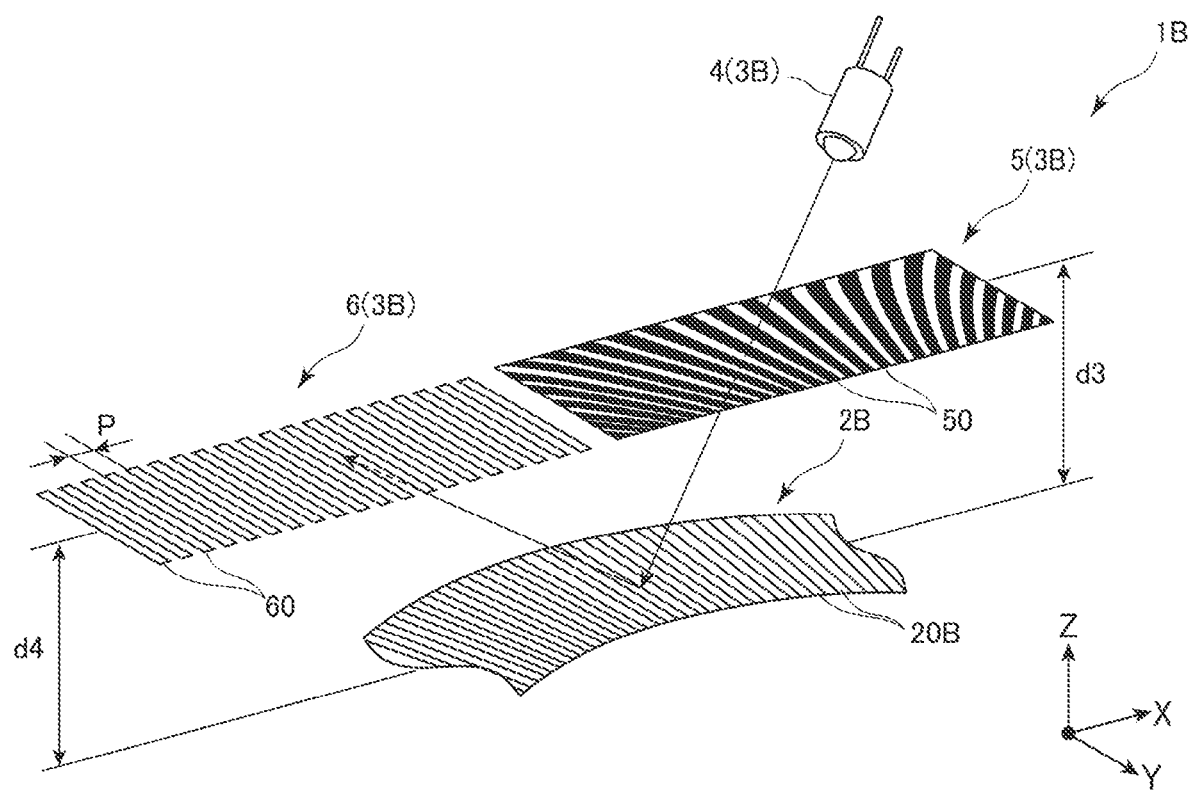
FIG. 4 is a perspective view schematically showing a photoelectric rotary encoder according to a third embodiment.

FIG. 4 is a perspective view schematically showing a photoelectric rotary encoder 1B according to the third embodiment.

In the above-described first embodiment, a transmissive photoelectric rotary encoder 1 is described in which the grating-like pattern 20 of the scale 2 transmits light therethrough. The scale 2B of the third embodiment differs from that of the above-described first embodiment in that it has a grating-like pattern 20B that reflects light from the light source 4. In addition, by employing the grating-like pattern 20B that reflects light, the diffraction unit 5 and the light-receiving unit 6 in the head 3B of the third embodiment are disposed in different positions than in the first embodiment.

The grating-like pattern 20B preferably reflects the light diffracted at the diffraction unit 5 and delivers the reflected light to the light-receiving unit 6. For this reason, the diffraction unit 5 and the light-receiving unit 6 are co-planar, as shown in FIG. 4. Such disposition ensures that the separation distance between the diffraction unit 5 and the scale 2B and the separation distance between the scale 2 and the light-receiving unit 6 can be made equal. Specifically, the separation distance d3 between the diffraction unit 5 and the scale 2B and the separation distance d4 between the scale 2B and the light-receiving unit 6 are the same. The light delivered from the light source 4 is diffracted at the diffraction unit 5, reflected at the scale 2B, and delivered to the light-receiving unit 6.

In such third embodiment, the same effects as in (1) to (5) of the first and second embodiments may be achieved, and the following effects may also be achieved:

(6) Since the scale 2B has a grating-like pattern 20B that reflects light from the light source 4, the light that has passed through the diffraction unit 5 can be reflected by the scale 2B and folded back into the light-receiving unit 6. For this reason, the diffraction unit 5 and the light-receiving unit 6 can be co-planar. Therefore, in the photoelectric rotary encoder 1B, the precision reduction in the interference fringes can be suppressed by being able to dispose, with ease, the respective components at equal distances. The photoelectric rotary encoder 1B can also be made compact since the light is reflected by the scale 2B.

Fourth Embodiment

The fourth embodiment of the present invention will be described below with reference to the drawings. In the following description, previously described parts are denoted by the same reference numbers and the descriptions thereof will be omitted.

Figure 5:
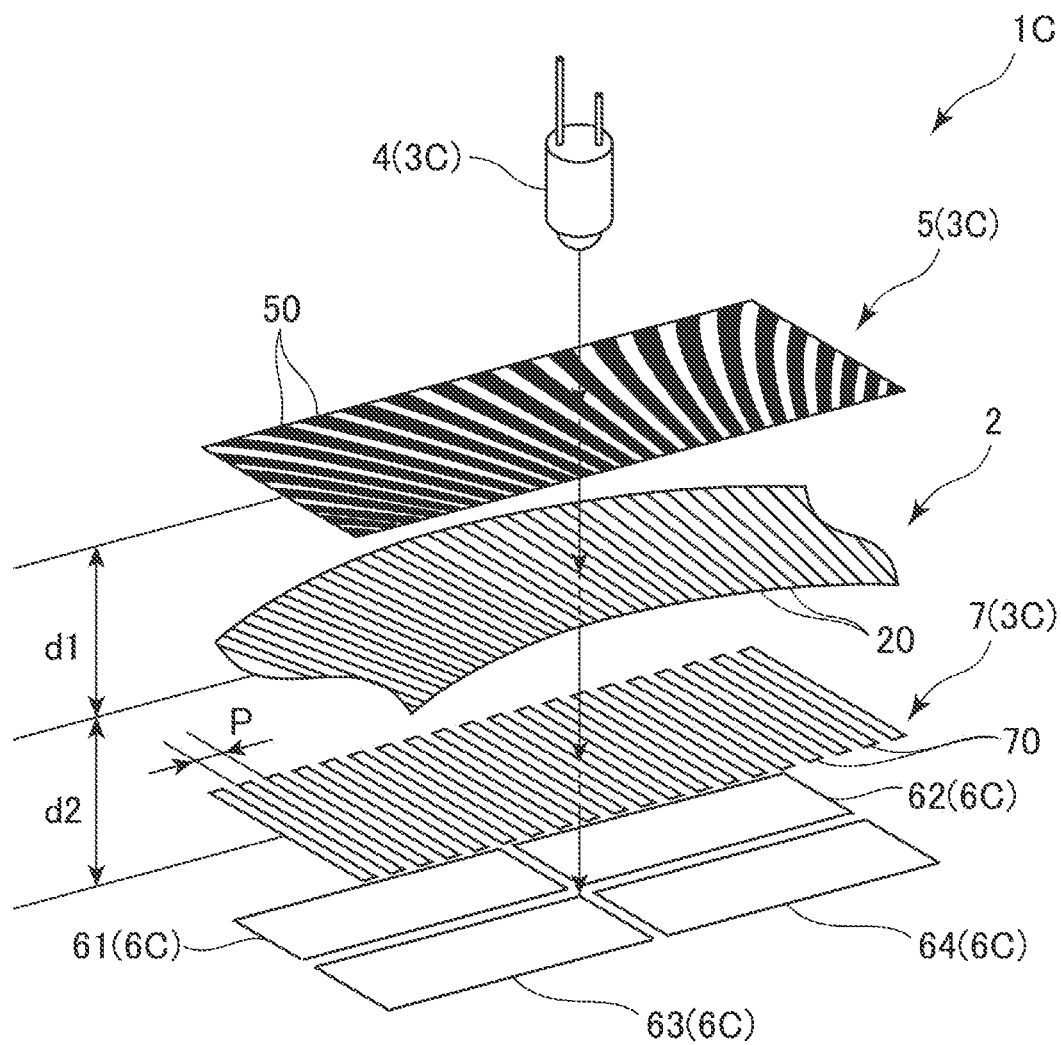
FIG. 5 is a perspective view schematically showing a photoelectric rotary encoder according to a fourth embodiment.

FIG. 5 is a perspective view schematically showing a photoelectric rotary encoder 1C according to the fourth embodiment.

In the above-described first embodiment, the plurality of light-receiving elements 60 of the light-receiving unit 6 are formed as a plurality of linear grating parts with a predetermined period. The fourth embodiment differs from the above-described first embodiment in that the head 3C includes a passage unit 7 with a plurality of grating parts 70, and the plurality of grating parts 70 are formed as a plurality of linear grating parts. In addition, the fourth embodiment differs from the above-described first embodiment in that the light-receiving unit 6C is not provided with linear grating parts since the passage unit 7 is provided.

As shown in FIG. 5, the passage unit 7 is disposed in the travel direction of the light that has passed through the scale 2 and is disposed parallel to the plate surface of the scale 2. The passage unit 7 has a plurality of linear grating parts, i.e., the plurality of grating parts 70, in the plane parallel to the plate surface of the scale 2. The passage unit 7 is formed such that it is elongate in the direction parallel to the direction orthogonal to the radial direction of the scale 2. The passage unit 7 is made of a translucent member, such as glass, that allows light to transmit through the passage unit. The plurality of grating parts 70 of the passage unit 7 are formed as a plurality of linear grating parts having a predetermined period along the orthogonal direction orthogonal to the radial direction from the center on the axis of rotation of the scale 2.

The light-receiving unit 6C receives the light that has passed through the passage unit 7. The light-receiving unit 6C receives interference fringes (not shown) caused by diffraction at the diffraction unit 5 and passing through the passage unit 7 via the scale 2. The interference fringes have a predetermined period along the orthogonal direction. Specifically, the light-receiving unit 6C includes a first light-receiving part 61, a second light-receiving part 62, a third light-receiving part 63, and a fourth light-receiving part 64. The first light-receiving part 61 receives light with a phase of 0 degrees. The second light-receiving part 62 receives light with a phase of 90 degrees. The third light-receiving part 63 receives light with a phase of 180 degrees. The fourth light-receiving part 64 receives light with a phase of 270 degrees. The light-receiving unit 6C acquires four-phase signals from the plurality of light rays, each with a different phase, received by the light-receiving parts 61 to 64, and acquires the amount of displacement based on the four-phase signals. Here, the light-receiving unit 6C includes the plurality of light-receiving parts 61 to 64 to acquire four-phase signals; however, any configuration may be employed for the light-receiving unit 6C as long as it can acquire the amount of displacement from the interference fringes, which are interference light. For example, the light-receiving unit may be configured to acquire a three-phase signal instead of a four-phase signal.

In such embodiment, the same effects as in (1) to (6) of the first to third embodiments may be achieved, and the following effects may also be achieved:

(7) In terms of the relationship among the diffraction unit 5, the scale 2 and the passage unit 7, the plurality of grating parts 50 of the diffraction unit 5 are formed as a plurality of deformed grating parts, and the plurality of grating parts 70 of the passage unit 7 are formed as linear grating parts. The deformed grating parts 50 correct the distortion of the interference fringes and can generate interference fringes that are generally similar to those in the photoelectric linear encoders on the light-receiving unit 6C. As such, the light-receiving unit 6C can acquire the interference fringes generally similar to those in the photoelectric linear encoders. Therefore, detection precision can be maintained while the three-grating principle is employed in the photoelectric rotary encoder 1C.

(8) The photoelectric rotary encoder 1C can acquire the interference fringes without having a plurality of light-receiving elements disposed with a predetermined period in the light-receiving unit 6C due to the provision of the passage unit 7 having a plurality of grating parts 70, which are linear grating parts.

Modification of Embodiment

It should be noted that the present invention is not limited to the above-described respective embodiments, and any variation, improvement, etc. is included in the present invention to the extent that the object of the present invention can be achieved.

For example, in the above-described respective embodiments, the photoelectric rotary encoders 1, 1A-1C used in measuring equipment are described, but the photoelectronic rotary encoders are not particularly limited as to the format of the detector, the detection method, and the like. In addition, the photoelectric rotary encoders may also be installed and used in other equipment, rather than in measuring equipment.

In the above-described respective embodiments, the plurality of deformed grating parts 50, 50A are formed in the diffraction units 5, 5A, but a plurality of deformed grating parts may be formed as the light-receiving elements in the above-described first embodiment or may be formed in the passage unit in the above-described fourth embodiment. Further, in the above-described respective embodiments, the plurality of deformed grating parts 50, 50A are formed in line-symmetry with respect to the axis L in the orthogonal direction orthogonal to the axis of rotation, but they do not need to be formed in line-symmetry.

The deformed grating parts 50 are formed based on the curve $C_n$ determined by the expression (1) in the above-described first embodiment and the deformed grating parts 50A are formed based on the curve $C_{n+1}(x)$ determined by the expression (2) in the above-described second embodiment, but the deformed grating parts may be formed based on a curve different from the curves determined by the expressions (1) and (2) or they may be formed in a radial fashion based on a straight line, rather than a curve.

In short, it is sufficient if the deformed grating parts are formed such that they spread out wide, from the center on the axis of rotation, along the grating-like pattern of the scale.

INDUSTRIAL APPLICABILITY

As described above, the present invention can suitably be applied to photoelectric rotary encoders.

What is claimed is:

1. A photoelectric rotary encoder comprising: a generally disk-shaped scale with a grating-like pattern formed with a predetermined period along a measurement direction, the measurement direction being a direction of rotation of a measurement target that rotates on a predetermined axis, the scale being plate-like and centered on an axis of rotation; and a head that detects, from the scale, the amount of displacement caused by the rotation of the measurement target, the photoelectric rotary encoder being characterized in that
the head comprises:
a light source that delivers light to the scale;
a diffraction unit that is disposed between the light source and the scale and is disposed parallel to a plate surface of the scale, the diffraction unit having a plurality of grating parts formed in a predetermined shape in a plane parallel to the plate surface of the scale in order to diffract the light from the light source, and the diffraction unit being formed such that the diffraction unit is elongate in a direction parallel to a direction orthogonal to a radial direction of the scale;
a passage unit that is disposed in a travel direction of the light that has passed through the scale and is disposed parallel to a plate surface of the scale, the passage unit having a plurality of grating parts formed in a predetermined shape in a plane parallel to the plate surface of the scale in order to allow the light that has passed through the scale to pass through the passage unit, and the passage unit being formed such that the passage unit is elongate in the direction parallel to the direction orthogonal to the radial direction of the scale; and
a light-receiving unit that receives the light that has passed through the passage unit,
wherein the plurality of grating parts of either one of the diffraction unit or the passage unit are formed as a plurality of deformed grating parts that spread out wide, from the center on the axis of rotation, along the grating-like pattern of the scale, and the plurality of grating parts of the other one of the diffraction unit or the passage unit are formed as a plurality of linear grating parts having a predetermined period along the orthogonal direction orthogonal to the radial direction from the center on the axis of rotation of the scale, and
wherein the light-receiving unit receives interference light having a predetermined period along the orthogonal direction, the interference light being caused by diffraction at the diffraction unit and passing through the passage unit via the scale.

2. The photoelectric rotary encoder according to claim 1, characterized in that
the plurality of grating parts in the diffraction unit are formed as a plurality of deformed grating parts that spread out wide, from the center on the axis of rotation, along the grating-like pattern of the scale.

3. The photoelectric rotary encoder according to claim 1, characterized in that
the plurality of deformed grating parts are formed in line-symmetry with respect to an axis, which is in an orthogonal direction orthogonal to the axis of rotation.

4. The photoelectric rotary encoder according to claim 1, characterized in that among the plurality of deformed grating parts, if a deformed grating part located on the axis in the orthogonal direction orthogonal to the rotation axis is denoted as the $0^{th}$ deformed grating part, the predetermined period of the linear grating parts is denoted as P, a radius from the axis of rotation to the scale is denoted as R, and a distance in the width direction of the scale is denoted as x, the shape of an $n^{th}$ deformed grating part is formed based on a curve $C_n$ determined by expression (1):

$$C_n = \frac{Pn\cos\frac{Pn}{R}\tan\frac{P}{R}x}{2P\cos\frac{Pn}{R} - \tan\frac{Pn}{R}x}. \quad (1)$$

5. The photoelectric rotary encoder according to claim 1, characterized in that among the plurality of deformed grating parts, if a deformed grating part located on the axis in the orthogonal direction orthogonal to the rotation axis is denoted as the $0^{th}$ deformed grating part, the predetermined period of the linear grating parts is denoted as P, a radius from the axis of rotation to the scale is denoted as R, and a distance in the width direction of the scale is denoted as x, the shape of an $n^{th}$ deformed grating part is formed based on a curve $C_{n+1}(x)$ determined by expression (2):

$$C_{n+1}(x) = C_n(x) - \frac{PR\left(\tan\frac{(n+1)P}{R} - \tan\frac{nP}{R}\right)x}{R\left(\tan\frac{(n+1)P}{R} - \tan\frac{nP}{R}\right)x - 2P}. \quad (2)$$

6. The photoelectric rotary encoder according to claim 1, characterized in that the scale comprises a grating-like pattern that reflects the light from the light source, and the grating-like pattern reflects the light diffracted at the diffraction unit.

7. A photoelectric rotary encoder comprising: a generally disk-shaped scale with a grating-like pattern formed with a predetermined period along a measurement direction, the measurement direction being a direction of rotation of a measurement target that rotates on a predetermined axis, the scale being plate-like and centered on an axis of rotation; and a head that detects, from the scale, the amount of displacement caused by the rotation of the measurement target, the photoelectric rotary encoder being characterized in that the head comprises:

a light source that delivers light to the scale;

a diffraction unit that is disposed between the light source and the scale and is disposed parallel to a plate surface of the scale, the diffraction unit having a plurality of grating parts formed in a predetermined shape in a plane parallel to the plate surface of the scale in order to diffract the light from the light source, and the diffraction unit being formed such that the diffraction unit is elongate in a direction parallel to a direction orthogonal to a radial direction of the scale; and a light-receiving unit that is disposed in a travel direction of the light that has passed through the scale and is disposed parallel to the plate surface of the scale, the light-receiving unit having a plurality of light-receiving elements formed in a predetermined shape in a plane parallel to the plate surface of the scale in order to receive the light that has passed through the scale, and the light-receiving unit being formed such that the light-receiving unit is elongate in the direction parallel to the direction orthogonal to the radial direction of the scale, wherein either one of the plurality of grating parts of the diffraction unit or the plurality of light-receiving elements of the light-receiving unit are formed as a plurality of deformed grating parts that spread out wide, from the center on the axis of rotation, along the grating-like pattern of the scale, and the other one of the plurality of grating parts of the diffraction unit or the plurality of light-receiving elements of the light-receiving unit are formed as a plurality of linear grating parts having a predetermined period along the orthogonal direction orthogonal to the radial direction from the center on the axis of rotation of the scale, and wherein the light-receiving unit receives interference light having a predetermined period along the orthogonal direction, the interference light being caused by diffraction at the diffraction unit and passing through the passage unit via the scale.

8. The photoelectric rotary encoder according to claim 7, characterized in that the plurality of grating parts in the diffraction unit are formed as a plurality of deformed grating parts that spread out wide, from the center on the axis of rotation, along the grating-like pattern of the scale.

9. The photoelectric rotary encoder according to claim 7, characterized in that the plurality of deformed grating parts are formed in line-symmetry with respect to an axis, which is in an orthogonal direction orthogonal to the axis of rotation.

10. The photoelectric rotary encoder according to claim 7, characterized in that among the plurality of deformed grating parts, if a deformed grating part located on the axis in the orthogonal direction orthogonal to the rotation axis is denoted as the $0^{th}$ deformed grating part, the predetermined period of the linear grating parts is denoted as P, a radius from the axis of rotation to the scale is denoted as R, and a distance in the width direction of the scale is denoted as x, the shape of an $n^{th}$ deformed grating part is formed based on a curve $C_n$ determined by expression (1):

$$C_n = \frac{Pn\cos\frac{Pn}{R}\tan\frac{P}{R}x}{2P\cos\frac{Pn}{R} - \tan\frac{Pn}{R}x}. \quad (1)$$

11. The photoelectric rotary encoder according to claim 7, characterized in that among the plurality of deformed grating parts, if a deformed grating part located on the axis in the orthogonal direction orthogonal to the rotation axis is denoted as the $0^{th}$ deformed grating part, the predetermined period of the linear grating parts is denoted as P, a radius from the axis of rotation to the scale is denoted as R, and a distance in the width direction of the scale is denoted as x, the shape of an $n^{th}$ deformed grating part is formed based on a curve $C_{n+1}(x)$ determined by expression (2):

$$C_{n+1}(x) = C_n(x) - \frac{PR\left(\tan\frac{(n+1)P}{R} - \tan\frac{nP}{R}\right)x}{R\left(\tan\frac{(n+1)P}{R} - \tan\frac{nP}{R}\right)x - 2P}. \quad (2)$$

12. The photoelectric rotary encoder according to claim 7, characterized in that
   the scale comprises a grating-like pattern that reflects the light from the light source, and
   the grating-like pattern reflects the light diffracted at the diffraction unit.

\* \* \* \* \*